(No Model.)

S. E. HUGHES.
PNEUMATIC DISPATCH APPARATUS.

No. 504,164. Patented Aug. 29, 1893.

Witnesses:
Murray C. Boyer
A. V. Groupe

Inventor:
Smith E. Hughes
by his Attorneys
Howson & Howson

UNITED STATES PATENT OFFICE.

SMITH E. HUGHES, OF PHILADELPHIA, PENNSYLVANIA, ASSIGNOR OF ONE-HALF TO MILO D. BALDY, OF SAME PLACE.

PNEUMATIC DISPATCH APPARATUS.

SPECIFICATION forming part of Letters Patent No. 504,164, dated August 29, 1893.

Application filed January 9, 1893. Serial No. 457,785. (No model.)

*To all whom it may concern:*

Be it known that I, SMITH E. HUGHES, a citizen of the United States, and a resident of Philadelphia, Pennsylvania, have invented certain Improvements in Pneumatic Dispatch Apparatus, of which the following is a specification.

The object of my invention is to provide a simple and efficient form of pneumatic dispatch apparatus more especially devised for use in mercantile establishments, to afford a ready means of communication between a central station, such as a cashier's desk and any number of outlying stations, such as the various counters of the store.

My invention comprises a special arrangement of pipes and valves, and a special form of controlling valve and its operating mechanism whereby the air pressure is exerted to force the carrier from one station to another.

Figure 1:
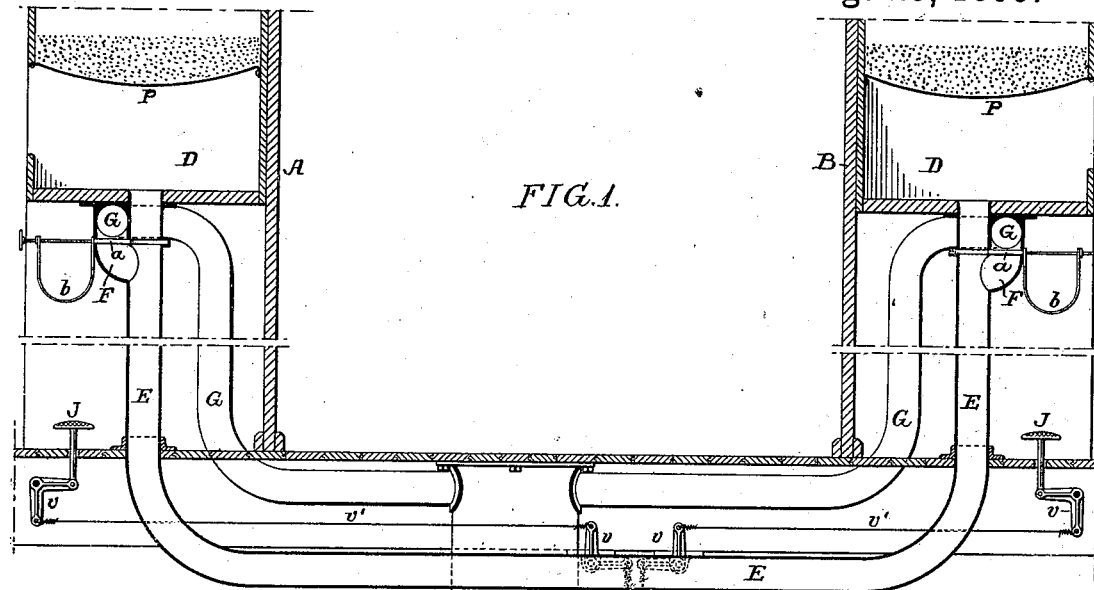
Figures 2, 3, 5:
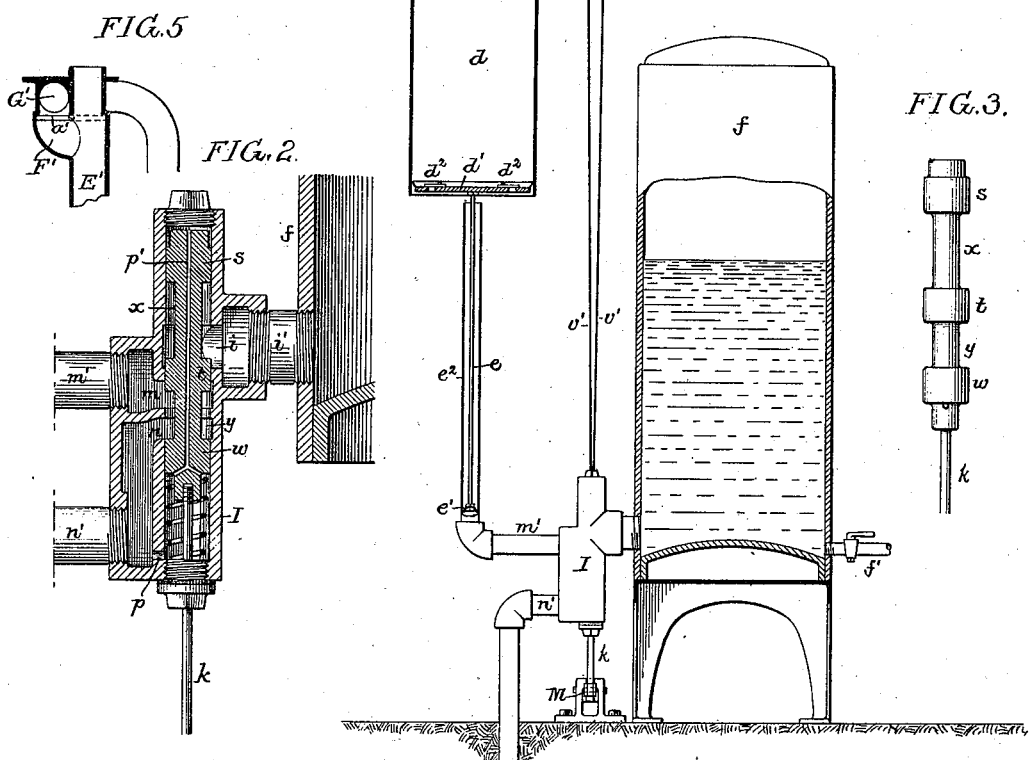
Figure 4:
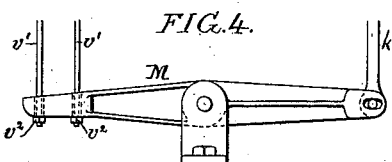

In the accompanying drawings:—Figure 1, is a view, partly in elevation and partly in section, and illustrating apparatus embodying my invention as adapted for two stations. Fig. 2, is a longitudinal section, on an enlarged scale, of valve mechanism forming part of the device. Fig. 3, is an elevation of the valve. Fig. 4, is a side elevation, also on an enlarged scale, of another element of the device; and Fig. 5, is a view illustrating a modification of one feature of the invention.

In Fig. 1, A and B represent two stations intended to be connected by a pneumatic dispatch system. The section A may, for instance, represent the central station or cashier's desk, and the station B one of the counters of a mercantile establishment. At each station is a box, table, counter, tray, or like structure D, and from one to the other of these structures extends a pipe E, which is preferably carried beneath the floor of the room or apartment, as illustrated, but which may, if desired, be carried over head or in any other position which will be found most convenient. At each station, this pipe E is provided with a short branch pipe F, and in both pipes, at a point close to the junction of the two, are formed guides for a sliding valve $a$, the stem of which is acted upon by a spring $b$ tending to project it, so that the normal position of the valve is that shown in Fig. 1, where it closes the branch pipe F, the pipe E being open for the passage through it, in either direction, of the carrier which traverses the pipe from station to station. Both of the branch pipes F communicate with a reservoir of air under pressure, such communication being effected by means of pipes G, as shown in Fig. 1.

In the present instance the air pressure mechanism is similar to that set forth in my Patent No. 423,768, dated March 18, 1890, and comprises a cylinder $d$, open at the bottom and having a plunger $d'$ connected by a rod $e$ to a piston $e'$ in a cylinder $e^2$ of much less diameter than the cylinder $d$, said cylinder $e^2$ communicating, through a valve chest I, with a reservoir $f$ which is supplied with water under pressure from a pipe $f'$, so that this water, rising in the reservoir, will compress the air above it. When, therefore, communication is opened between the reservoir $f$ and the cylinder $e^2$, the piston $e'$ and plunger $d'$ will be forced upward and a blast of air will be driven through the pipes G. Hence, if, just before such blast of air through the pipes G, the valve $a$ of one of the branches F is pushed inward, after the dropping of a carrier into the pipe E, communication will be opened between one of the pipes G and one end of said pipe E and the carrier will be blown through the pipe to the other station, the valve $a$ serving to close the pipe E at the station from which the carrier was dispatched. As soon as the carrier has reached its destination, the valve $a$ may be released, so that it will be restored to its normal position by the spring $b$, the pipe E being again opened and cut off from communication with the pipe G. The piston $d'$ has valves $d^2$ which open and permit the quick descent of said piston as soon as the exhaust from the cylinder $e^2$ is opened.

The valve mechanism which I use in connection with the air pressure device consists of a chest I, having an inlet port $i$, communicating through a pipe $i'$ with the reservoir $f$, a service port $m$ communicating through a pipe $m'$ with the cylinder $e^2$, and a discharge port $n$ communicating through a pipe $n'$ with a sewer or other drainage pipe, and in the cylindrical bore of the valve chest is a cylindrical valve having three pistons $s$, $t$ and $w$ with intervening channels or spaces $x$ and $y$. The normal position of the valve is that illustrated in Fig. 2, in which position the valve may be maintained by a spiral spring $z$, or equivalent means, and, when in this position, the piston $t$ of the valve closes communication between the inlet port $i$ and service port $m$ of the valve chest, the channel $y$ providing a communication between said service port and the discharge port $n$, so that the water will escape from the cylinder $e^2$ and will permit the pistons $d'$ $e'$ to assume the lowest positions in their respective cylinders. When the valve is lowered, however, so that the piston $t$ cuts off communication between the ports $m$ and $n$ the channel $x$ opens communication between the ports $i$ and $m$, and water flows from the reservoir $f$ to the cylinder $e^2$, so as to operate the air blast apparatus. The lower portion of the chest I communicates, through an opening $p$, with the discharge passage of the chest, so that the accumulation of water in the lower portion of the chest is prevented, and a central passage $p'$ in the valve provides for the flow of air or water from the upper to the lower portion of the chest in case there should be any leakage past the upper piston $s$. Although I prefer the valve having the three pistons, it will be evident that, as it is the central piston $t$ that performs the cut off duty, that piston alone may be used in some cases.

At each station is a push plate or treadle J, and each of these push plates may be connected to the stem $k$ of the valve by such mechanism that when the push plate is depressed the valve will be opened to permit a flow of water from the reservoir $f$ to the cylinder $e^2$, and, when released, will permit said valve to close, as shown in Fig. 2. In the present instance each push plate is connected, by means of bell crank levers $v$ and wires or cords $v'$, to one arm of a lever M, hung to a suitable bracket beneath the valve chest I, the other arm of said lever being connected to the valve stem $k$ (see Fig. 4). Each of the wires $v'$ passes through a slot in the lever M and has a nut or collar $v^2$ bearing upon said lever so that an upward pull upon either of the wires $v'$ will operate the valve, or, if desired, there may be rigid connections between the bell crank levers, so that the valve will be operated by a push instead of a pulling action, the same provision being made for permitting the operation of the lever M by pressure upon either push plate.

Although I have shown my invention as applied to but two stations, it will be evident that the central station may be connected by independent pipes E with as many outlying stations as desired, each of said outlying stations being also provided with a blast pipe, and in a system having a number of stations economy is effected by running a single blast pipe throughout the establishment and connecting said main blast pipe, by short branches, with the various stations. At each of the stations B, and above the mouth of the pipe E is a bag or pouch P having a bottom of leather, rubber, or like flexible material, and containing sand, fine shot or other fine granular material, the bottom of the pouch serving as a cushion for receiving the impact of the carrier ejected from the pipe E, said carrier then falling back upon the table or tray D, from which it can be conveniently removed by the attendant. In sending the carrier from one station to the other it is simply necessary to drop it into the open pipe E and then to close the valve $a$, and to hold the latter closed during the time that the pressure of the foot is being exerted upon the push plate J. In cases where the distance between stations is such that a single blast from the cylinder $d$ is not sufficient to force the carrier through the pipe, the push plate J may be first depressed, then released, and then again depressed, each depression causing an operation of the blast apparatus and a fresh blast of air into the pipe E. A swinging valve, such for instance as shown at $a'$, Fig. 5, may in some cases replace the slide valve $a$, but the latter is preferred.

Having thus described my invention, I claim and desire to secure by Letters Patent—

1. The combination of the conveyer pipe connecting two stations, and normally open at each end, a short right angled branch pipe near each end of said conveyer pipe, a blast pipe communicating with each of said branches, slide valves located at the junction of the conveyer pipe and branch pipes, and movable so as to close one or other of the same, and springs whereby said valves are normally retained in position to close the branch pipes, substantially as specified.

2. The combination of the conveyer pipe connecting two stations and normally open at each end, a branch pipe near each end of said conveyer pipe, a blast pipe communicating with each of said branches, valves which normally tend to close the branches but which can be moved so as to temporarily close the conveyer pipe, and means for causing intermittent pulsations of air in the blast pipe, substantially as specified.

3. The combination of the conveyer pipe connecting two stations, blast apparatus communicating with said pipe near each end, valves adapted either to open the conveyer pipe and cut off the blast, or to close the conveyer pipe and open the blast, an air forcing device connected with the blast pipe, a valve controlling the operation of said air forcing device, and push plates located at each station and connected to said valve, substantially as specified.

4. The combination of the conveyer pipe connecting two stations, air and water cylinders containing connected pistons, blast pipes leading from the air cylinder to each end of the conveyer pipe, valves adapted to close the conveyer pipe and open the blast pipe, or to close the blast pipe and open the conveyer pipe, a reservoir containing liquid under pressure, a valve controlling the flow of said liquid into the water cylinder, and push plates located at each station, and connected to said valve, substantially as specified.

5. The combination of the pressure reservoir, the water cylinder, the valve chest having inlet, service, discharge and drainage ports, and a valve having three pistons, and a drainage passage extending through it, substantially as specified.

6. The combination of the conveyer pipe, the blast pipe communicating with said conveyer pipe at each end, valves serving to open the conveyer pipe, and close the blast pipe, or vice versa, an air forcing device connected with the blast pipe, a valve controlling the operation of said air forcing device, a lever connected to said valve, push plates at each of the stations connected by the conveyer pipe, and devices for transmitting the movement of said push plates to the valve lever, such devices having a bearing only on one side of the lever so that either will operate the lever without affecting the other, substantially as specified.

In testimony whereof I have signed my name to this specification in the presence of two subscribing witnesses.

SMITH E. HUGHES.

Witnesses:
FRANK E. BECHTOLD,
JOSEPH H. KLEIN.